United States Patent
Chen et al.

(10) Patent No.: US 12,339,732 B2
(45) Date of Patent: Jun. 24, 2025

(54) FAULT ANALYSIS DEVICE AND FAULT ANALYSIS METHOD THEREOF

(71) Applicant: NANYA TECHNOLOGY CORPORATION, New Taipei (TW)

(72) Inventors: Chien Yu Chen, New Taipei (TW); Meng-Kai Hsieh, Nantou County (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 492 days.

(21) Appl. No.: 17/960,158

(22) Filed: Oct. 5, 2022

(65) Prior Publication Data

US 2024/0118964 A1 Apr. 11, 2024

(51) Int. Cl.
*G06F 11/07* (2006.01)
*H04L 41/0631* (2022.01)

(52) U.S. Cl.
CPC ........ *G06F 11/079* (2013.01); *H04L 41/0631* (2013.01)

(58) Field of Classification Search
CPC .. G06F 11/079; H04L 41/0631; H04L 41/145; H04L 41/16; H04L 42/10; H04L 42/50; G01R 31/00
See application file for complete search history.

(56) References Cited

U.S. PATENT DOCUMENTS

| 6,265,949 B1* | 7/2001 | Oh | H04N 5/38 |
| | | | 348/E5.093 |
| 2017/0180181 A1* | 6/2017 | Chen | H04L 27/368 |
| 2022/0390525 A1* | 12/2022 | Bessho | G01R 19/2513 |
| 2024/0329152 A1* | 10/2024 | Ozaki | G01R 31/40 |

FOREIGN PATENT DOCUMENTS

| CN | 112733369 | 4/2021 |
| CN | 114969084 | 8/2022 |
| TW | 201802710 | 1/2018 |
| TW | 202101469 | 1/2021 |

OTHER PUBLICATIONS

"Office Action of Taiwan Counterpart Application", issued on May 19, 2023, p. 1-p. 7.

* cited by examiner

*Primary Examiner* — Dominic E Hawkins
(74) *Attorney, Agent, or Firm* — JCIPRNET

(57) ABSTRACT

A fault analysis device and a fault analysis method of the fault analysis device are provided. A sensing circuit senses a first distorted signal on a first signal transmission path of an abnormal signal device when the abnormal signal device performs a preset operation. A signal generating circuit provides a fault test signal to a second signal transmission path of a standard device corresponding to the first signal transmission path when the standard device performs the preset operation, so as to generate a second distorted signal on the second signal transmission path, where the first distorted signal and the second distorted signal have the same signal distortion characteristics.

12 Claims, 2 Drawing Sheets

FAULT ANALYSIS DEVICE AND FAULT ANALYSIS METHOD THEREOF

BACKGROUND

Technical Field

The disclosure relates to an analysis device; more particularly, the disclosure relates to a fault analysis device and a fault analysis method thereof.

Description of Related Art

With the rapid development of technologies, circuits of electronic products tend to be denser and more complicated to satisfy requirements for high efficiency and multiple functions. However, as the degree of circuit density and complexity is increased, signal interference has become a common phenomenon, especially in high working frequency circuits. The issue of signal interference is likely to cause abnormal operations of electronic products and may even lead to system collapse in severe cases. At present, there is no effective way to assist in studying and analyzing faults resulting from the issue of signal interference.

SUMMARY

The disclosure provides a fault analysis device and a fault analysis method thereof, which are conducive to analyzing a cause of signal interference and solving the issue associated with signal interference in electronic products.

In an embodiment of the disclosure, a fault analysis device including a sensing circuit and a signal generating circuit is provided. The sensing circuit senses a first distorted signal on a first signal transmission path of an abnormal signal device when the abnormal signal device performs a preset operation. The signal generating circuit provides a fault test signal to a second signal transmission path of a standard device corresponding to the first signal transmission path when the standard device performs the preset operation, so as to generate a second distorted signal on the second signal transmission path, where the first distorted signal and the second distorted signal have the same signal distortion characteristics, and a circuit architecture of the standard device is the same as a circuit architecture of the abnormal signal device.

According to an embodiment of the disclosure, the first signal transmission path and the second signal transmission paths are signal transmission paths between a processor and a memory.

According to an embodiment of the disclosure, the preset operation includes a standby operation, an access operation of the memory, or an erasing operation of the memory.

According to an embodiment of the disclosure, the fault analysis device further includes a control circuit that is coupled to the sensing circuit and the signal generating circuit and controls the signal generating circuit to generate the fault test signal according to the signal distortion characteristics of the first distorted signal.

According to an embodiment of the disclosure, the control circuit inputs the first distorted signal to an artificial intelligence (AI) model to output a categorization result and controls the signal generating circuit to generate the fault test signal according to the categorization result, where the categorization result includes a distortion factor category.

According to an embodiment of the disclosure, the first signal transmission path and the second signal transmission path include a bus or a power line.

In an embodiment of the disclosure, a fault analysis method of a fault analysis device is provided, and the fault analysis method includes following steps. A first distorted signal on a first signal transmission path of an abnormal signal device is sensed when the abnormal signal device performs a preset operation. A fault test signal is provided to a second signal transmission path of a standard device corresponding to the first signal transmission path when the standard device performs the preset operation, so as to generate a second distorted signal on the second signal transmission path, where the first distorted signal and the second distorted signal have the same signal distortion characteristics, and a circuit architecture of the standard device is the same as a circuit architecture of the abnormal signal device. A cause of fault of the abnormal signal device is determined according to the first distorted signal and the second distorted signal.

According to an embodiment of the disclosure, the first signal transmission path and the second signal transmission paths are signal transmission paths between a processor and a memory.

According to an embodiment of the disclosure, the preset operation includes a standby operation, an access operation of the memory, or an erasing operation of the memory.

According to an embodiment of the disclosure, the fault analysis method further includes generating the fault test signal according to the signal distortion characteristics of the first distorted signal.

According to an embodiment of the disclosure, the fault analysis method includes following steps. The first distorted signal is input to an artificial intelligence (AI) model to output a categorization result, where the categorization result includes a distortion factor category. The fault test signal is generated according to the categorization result.

According to an embodiment of the disclosure, the first signal transmission path and the second signal transmission path include a bus or a power line.

In view of the above, according to one or more embodiments of the disclosure, the fault test signal is provided to the second signal transmission path of the standard device corresponding to the first signal transmission path of the abnormal signal device, so as to generate the second distorted signal on the second signal transmission path, where the first and second distorted signals have the same signal distortion characteristics. As such, the cause of signal interference in the abnormal signal device may be learned, and thereby the issue of signal interference in the electronic products may be solved.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure

DESCRIPTION OF THE EMBODIMENTS

Figure 1:
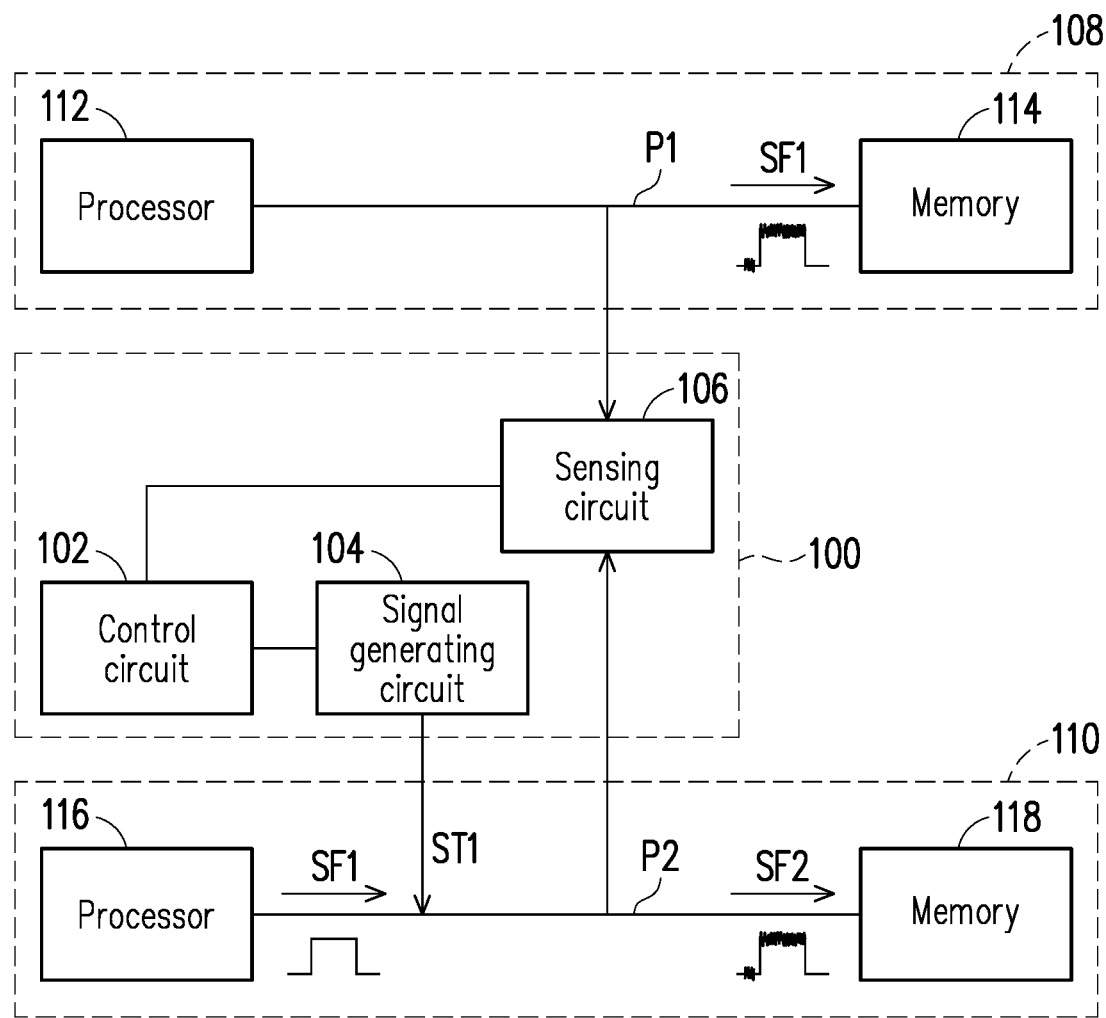
FIG. 1 is a schematic block view illustrating a fault analysis device according to an embodiment of the disclosure.

FIG. 1 is a schematic block view illustrating a fault analysis device according to an embodiment of the disclosure. The fault analysis device 100 may include a control circuit 102, a signal generating circuit 104, and a sensing circuit 106, and the control circuit 102 is coupled to the signal generating circuit 104 and the sensing circuit 106. The sensing circuit 106 is configured to sense a distorted signal SF1 on a signal transmission path P1 of an abnormal signal device 108. For instance, when the abnormal signal device 108 performs a preset operation, the distorted signal SF1 on the signal transmission path P1 is sensed, and the abnormal signal device 108 may include, for instance, a cell phone, a notebook computer, or any other electronic device. The abnormal signal device 108 includes a processor 112 and a memory 114, and the signal transmission path P1 may be, for instance, a signal transmission path between the processor 112 and the memory 114, such as a command bus, an address bus, a data bus, or a power line, which should however not be construed as a limitation in the disclosure. In addition, in the case where the signal transmission path P1 is the signal transmission path between the processor 112 and the memory 114, the memory 114 may include, for instance, a dynamic random access memory (DRAM), and the preset operation may include, for instance, a standby operation, an access operation of the memory, or an erasing operation of the memory, which should however not be construed as a limitation in the disclosure.

The signal generating circuit 104 may provide a fault test signal ST1 to a signal transmission path P2 of a standard device 110 when the standard device 110 performs the preset operation, where the standard device 110 is the same device as the abnormal signal device 108 and has the same circuit architecture as that of the abnormal signal device 108 (e.g., having a processor 116, a memory 118, and the signal transmission path P2), and the signal transmission path P2 of the standard device 110 corresponds to the signal transmission path P1. Namely, as to the circuit design, the signal transmission path P1 and the signal transmission path P2 are the same signal transmission path. The standard device 110 is a device that may operate normally; that is, there will be no signal distortion on the signal transmission path P2 corresponding to the signal transmission path P1.

Here, the sensing circuit 106 may, for instance, sense one or more signal lines specified in the abnormal signal device 108 (e.g., one or more specific signal lines in the bus) and one or more signal lines corresponding to the specified one or more signal lines in the standard device 110, and an object to which the signal generating circuit 104 provides the fault test signal ST1 is not limited to the one or more signal lines corresponding to the specified one or more signal line and may be other signal lines, such as the power line or any other signal line in the bus, which should however not be construed as a limitation in the disclosure.

The fault test signal ST1 is transmitted to the signal transmission path P2 of the standard device 110 by the signal generating circuit 104, so as to interfere with the signal Si transmitted on the signal transmission path P2 when the standard device 110 performs the preset operation, and a distorted signal SF2 may be generated on the signal transmission path P2. When the distorted signal SF2 on the signal transmission path P2 has the same distortion characteristics as those of the distorted signal SF1, it indicates that a signal interference manner of the signal generating circuit 104 is similar to a signal interference manner of a signal interference source of the abnormal signal device 108, whereby a cause of signal interference in the abnormal signal device 108 may be deduced, and the issue of signal interference in the related electronic products may be solved. The distortion characteristics of the distorted signals may include, for instance, a noise distribution manner in a frequency domain, an amplitude variation of the distorted signals, and so on, which should however not be construed as a limitation in the disclosure.

A method of generating the fault test signal ST1 may include a step of providing, for instance, by the signal generating circuit 104 controlled by the control circuit 102 according to a user's command, and in some embodiments, the fault test signal ST1 may also be spontaneously generated by the control circuit 102 according to the distortion characteristics of the distorted signal SF1. For instance, the control circuit 102 may input the distorted signal to an artificial intelligence (AI) model, and the AI model may output a categorization result according to the distortion characteristics of the distorted signal SF1. Here, the categorization result may include a distortion factor category, i.e., a category of the cause of generating the distorted signal SF1. The control circuit may can generate the fault test signal ST1 according to the categorization result, so as to generate the distorted signal SF2 on the signal transmission path P2 and determine whether the distorted signal SF2 has the same distortion characteristics as those of the distorted signal SF1. As such, the cause of signal interference may be determined. In some embodiments, it is likely to determine whether the distorted signal SF2 has the same distortion characteristics as those of the distorted signal SF1 by inputting the distorted signal SF2 into the AI model and determining the cause of signal interference.

Figure 2:
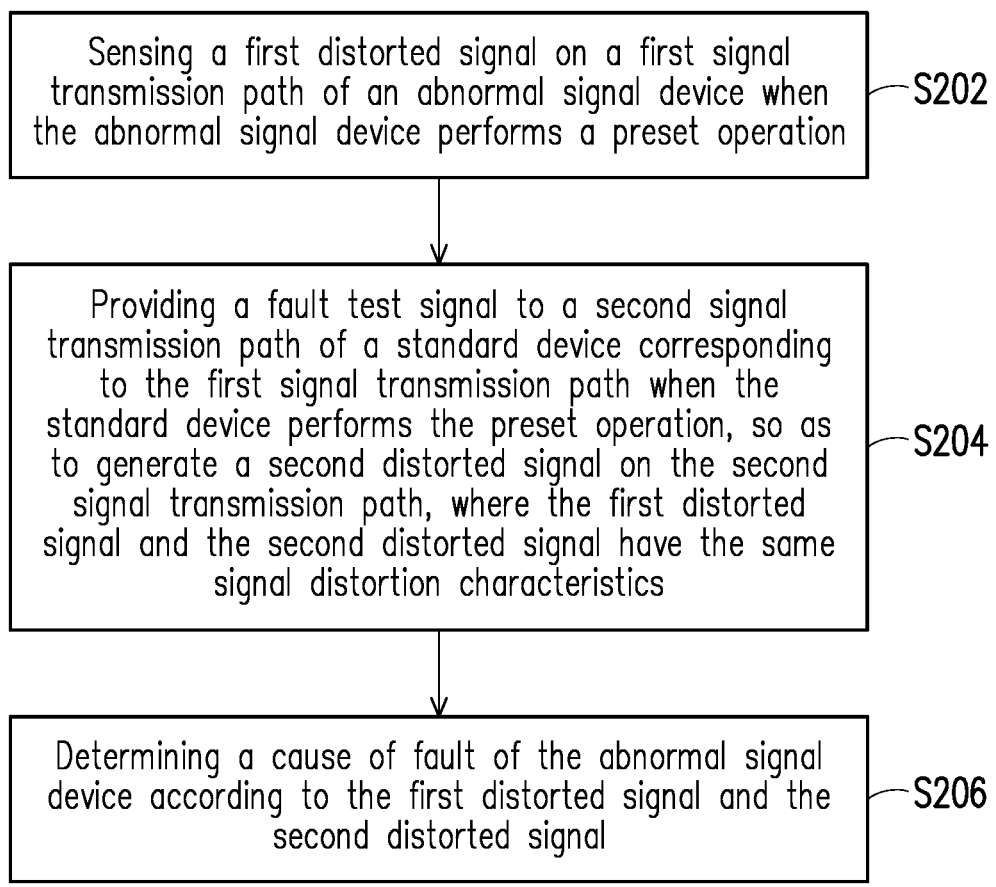
FIG. 2 is a flowchart illustrating a fault analysis method according to an embodiment of the disclosure.

FIG. 2 is a flowchart illustrating a fault analysis method according to an embodiment of the disclosure. According to the previous embodiment, it may be learned that the fault analysis method of the fault analysis device may include following steps. A first distorted signal on a first signal transmission path of an abnormal signal device is sensed when the abnormal signal device performs a preset operation (step S202). A fault test signal is provided to a second signal transmission path of a standard device corresponding to the first signal transmission path when the standard device performs the preset operation, so as to generate a second distorted signal on the second signal transmission path, where the second distorted signal have the same signal distortion characteristics as those of the first distorted signal (step S204). The standard device and the abnormal signal device have the same circuit architecture, the first signal transmission path and the second signal transmission path may be, for instance, the signal transmission path between a processor and a memory, such as a command bus, an address bus, a data bus, or a power line, which should however not be construed as a limitation in the disclosure. The memory may include DRAM, for instance, and the preset operation may, for instance, include a standby operation, an access operation of the memory, or an erasing operation of the memory, which should however not be construed as a limitation in the disclosure. In addition, the fault test signal may be generated according to the signal distortion characteristics of the first distorted signal, for instance. In some embodiments, the distorted signal may be input to an AI model to output a categorization result, and the fault test signal may be generated according to the categorization result. The categorization result may include a distortion factor category, i.e., a category of a cause of generating the distorted signal. A cause of fault of the abnormal signal device is determined according to the first distorted signal and the second distorted signal (step S206). For instance, when the second distorted signal has the same distortion characteristics as those of the first distorted signal, it indicates that a manner of interfering the second signal transmission path by the fault test signal is similar to a manner of interfering the first signal transmission path by a signal interference source, whereby a cause of signal interference in the abnormal signal device may be deduced.

To sum up, according to one or more embodiments of the disclosure, the fault test signal is provided to the second signal transmission path of the standard device corresponding to the first signal transmission path of the abnormal signal device, so as to generate the second distorted signal on the second signal transmission path, where the first and second distorted signals have the same signal distortion characteristics. As such, the cause of signal interference in the abnormal signal device may be learned, and thereby the issue of signal interference in the electronic products may be solved.

It will be apparent to those skilled in the art that various modifications and variations may be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A fault analysis device, comprising:
  a sensing circuit, sensing a first distorted signal on a first signal transmission path of an abnormal signal device when the abnormal signal device performs a preset operation; and
  a signal generating circuit, providing a fault test signal to a second signal transmission path of a standard device corresponding to the first signal transmission path when the standard device performs the preset operation, so as to generate a second distorted signal on the second signal transmission path, wherein the first distorted signal and the second distorted signal have same signal distortion characteristics, and a circuit architecture of the standard device is the same as a circuit architecture of the abnormal signal device.

2. The fault analysis device according to claim 1, wherein the first signal transmission path and the second signal transmission paths are signal transmission paths between a processor and a memory.

3. The fault analysis device according to claim 2, wherein the preset operation comprises a standby operation, an access operation of the memory, or an erasing operation of the memory.

4. The fault analysis device according to claim 1, further comprising:
  a control circuit, coupled to the sensing circuit and the signal generating circuit and controlling the signal generating circuit to generate the fault test signal according to the signal distortion characteristics of the first distorted signal.

5. The fault analysis device according to claim 4, wherein the control circuit inputs the first distorted signal to an artificial intelligence model to output a categorization result and controls the signal generating circuit to generate the fault test signal according to the categorization result, and the categorization result comprises a distortion factor category.

6. The fault analysis device according to claim 1, wherein the first signal transmission path and the second signal transmission path comprise a bus or a power line.

7. A fault analysis method of a fault analysis device, comprising:
  sensing a first distorted signal on a first signal transmission path of an abnormal signal device when the abnormal signal device performs a preset operation;
  providing a fault test signal to a second signal transmission path of a standard device corresponding to the first signal transmission path when the standard device performs the preset operation, so as to generate a second distorted signal on the second signal transmission path, wherein the first distorted signal and the second distorted signal have same signal distortion characteristics, and a circuit architecture of the standard device is the same as a circuit architecture of the abnormal signal device; and
  determining a cause of fault of the abnormal signal device according to the first distorted signal and the second distorted signal.

8. The fault analysis method according to claim 7, wherein the first signal transmission path and the second signal transmission paths are signal transmission paths between a processor and a memory.

9. The fault analysis method according to claim 8, wherein the preset operation comprises a standby operation, an access operation of the memory, or an erasing operation of the memory.

10. The fault analysis method according to claim 7, further comprising:
  generating the fault test signal according to the signal distortion characteristics of the first distorted signal.

11. The fault analysis method according to claim 10, further comprising:
  inputting the first distorted signal to an artificial intelligence model to output a categorization result, wherein the categorization result comprises a distortion factor category; and
  generating the fault test signal according to the categorization result.

12. The fault analysis method according to claim 7, wherein the first signal transmission path and the second signal transmission path comprise a bus or a power line.

* * * * *